March 1, 1927. 1,619,093
C. C. SUNDERLAND
ROPE TENSION TESTING DEVICE
Filed Dec. 22, 1922   2 Sheets-Sheet 1
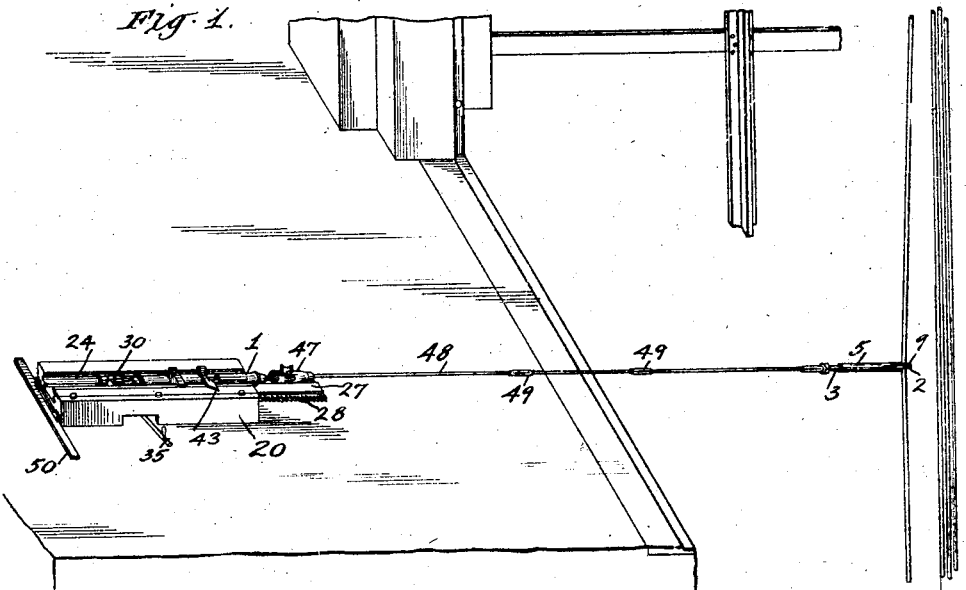
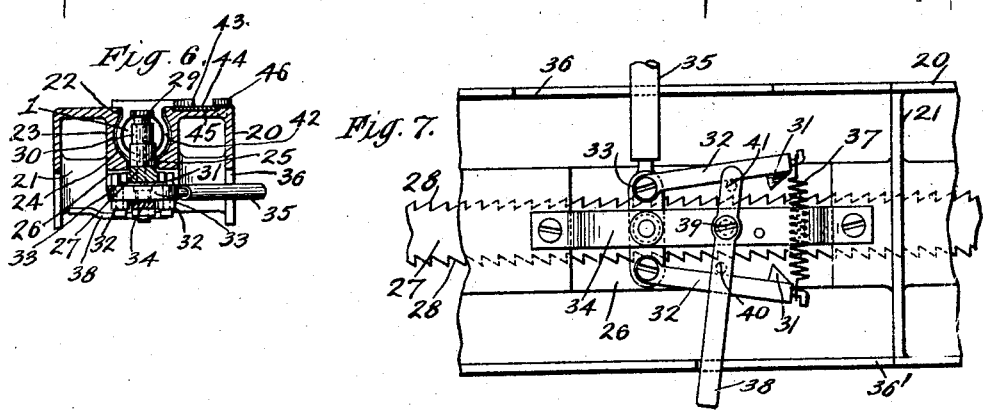
Inventor
Charles C. Sunderland
By his Attorneys

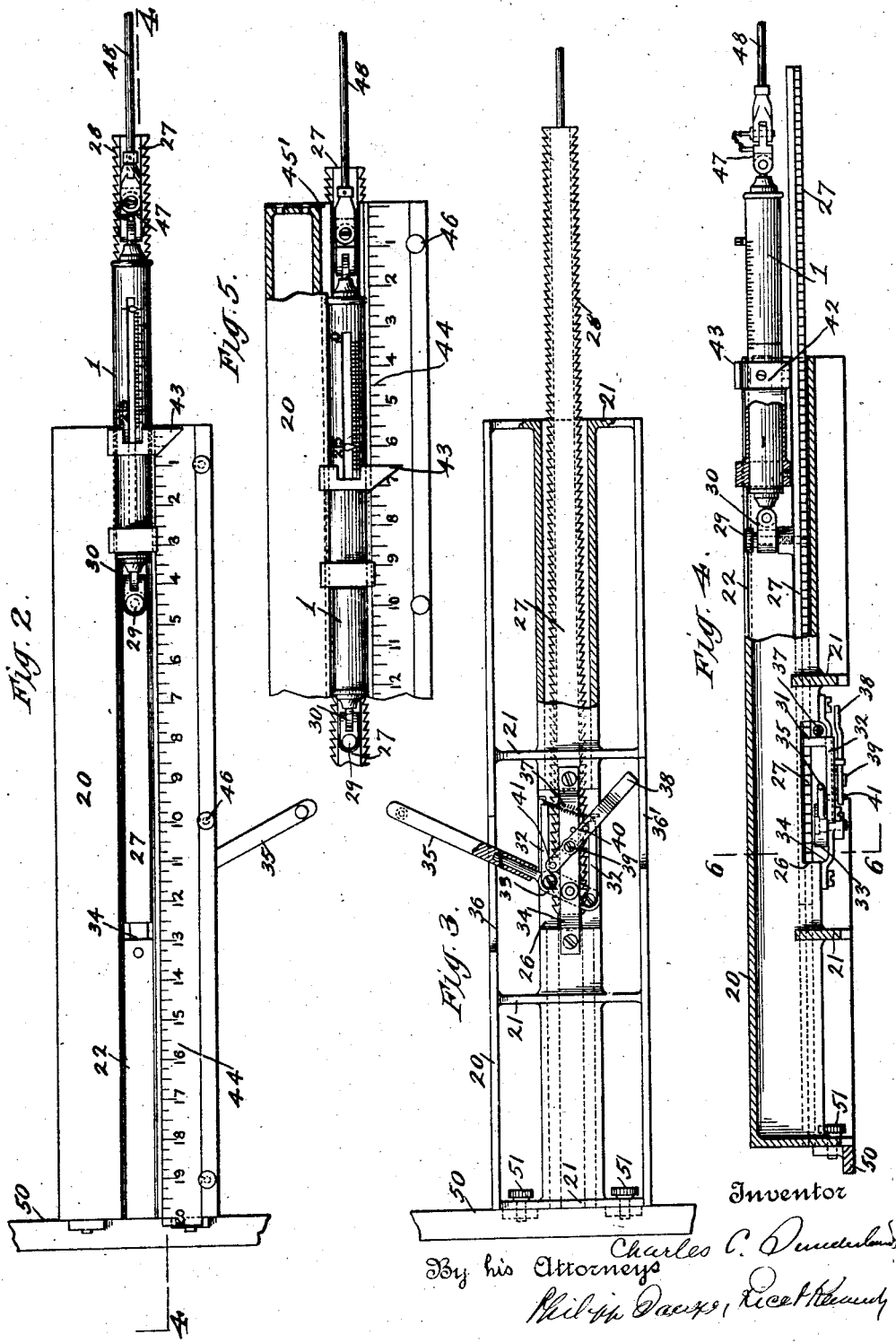

Patented Mar. 1, 1927.

1,619,093

UNITED STATES PATENT OFFICE.

CHARLES C. SUNDERLAND, OF TRENTON, NEW JERSEY, ASSIGNOR TO JOHN A. ROEBLING'S SONS COMPANY, OF TRENTON, NEW JERSEY, A CORPORATION OF NEW JERSEY.

ROPE-TENSION-TESTING DEVICE.

Application filed December 22, 1922. Serial No. 608,410.

This invention relates to improvements in rope tension testing devices.

It is the aim of the present invention to provide a simple, compact and efficient device for testing the tension of ropes, which will be found particularly useful in determining the relative loads carried by a plurality of elevator car ropes, so that, at the time of installation thereof, or later, proper adjustments may be made to cause each such rope to carry its proportionate share of the load. Heretofore, when installing or re-roping elevators, no reliable means for measuring the relative tension on the ropes were available, and the prevailing method, when attempting to equally distribute the load among a plurality of ropes, has been to depend solely on the "feel" of the ropes to determine their relative tension. This method has resulted in one or more ropes being comparatively loose, and it is not unusual to find one rope carrying more than twice the load carried by another. Furthermore, where the load is thus unequally distributed among a plurality of sheave ropes, the rope carrying the heaviest load, and consequently the tightest rope, will produce excessive wear, not only of the rope itself, but also of its sheave groove, with the result that such tight rope or ropes will ultimately cause the condemning of the whole set. Such a tight rope, also, by thus producing greater wear on its sheave groove, results in a differential wearing action of all the ropes and the sheave grooves and causes first one rope and then another to work at a disadvantage as the heaviest load is shifted from one rope to another as replacements are required and made. In elevator systems, also, great precision and care must be exercised in machining the sheave grooves to equal diameters, with consequent large expense. The present device will avoid the large cost and trouble of frequent replacement of sheaves, the life of the ropes, also, will be lengthened, and liability of breakage of such ropes, due to unequal tension and premature wear thereof, be avoided.

Briefly stated, the device comprises means for measuring, on a graduated indicator, the degree of lateral deflection to which each of a plurality of elevator ropes or cables is subject, when a predetermined lateral pressure or pull, measured in pounds or ounces by a pressure or spring pull scale or the like, is applied thereto, thus enabling accurate adjustments of such ropes or cables to be made for equal distribution of the loads thereon. Obviously, however, the device may also be operated to determine the relative tension of each of a plurality of elevator supporting ropes or cables, by measuring, in pounds or ounces, the lateral pressure or pull to which each of such ropes is subjected when laterally deflected a predetermined distance. The first method of operation, however, is the preferred one, and the description of operation of the device hereafter will be based thereon.

An embodiment of the invention will now be described in detail, in connection with the illustration thereof in the accompanying drawings, and the features forming the invention then be specifically pointed out in the claims.

In the drawings—

Figure 1 is a diagrammatic showing of a portion of an elevator shaft and a landing or floor, with the device in position on the floor attached to one of the sheave ropes;

Figure 2 is a top plan view of the device;

Figure 3 is a bottom plan view of the same;

Figure 4 is a section on the line 4—4 of Fig. 2;

Figure 5 is a top view of a portion of the device, showing the positions of the pressure and deflection indicators relatively to each other when a rope under a certain tension is being tested;

Figure 6 is a section on the line 6—6 of Fig. 4;

Figure 7 is a bottom plan view of the ratchet bar operating mechanism for producing lateral pull on a rope;

Figure 8 is a longitudinal section of a novel form of rope-engaging hook and means cooperating therewith for throwing such hook into and out of engagement with the rope to be tested; and Figures 9, 10, and 11 are detail views of the rope engaging hook in open and closed positions and the means for holding the hook open and for throwing it into holding engagement with the rope to be tested.

Referring now to the drawings, and particularly to Figures 2, 3, 4, and 6, the device comprises a casing 20, which may, for compactness, be of elongated form, and approximately rectangular in cross section. The casing of the device may advantageously be cast in one piece, and when thus or otherwise made is preferably provided with transverse strengthening ribs 21 at and intermediate its ends. In the top of the casing 20 is formed a longitudinal slot 22 having depending longitudinal side walls 23, which are hollowed out to form an approximately cylindrical groove 24, in the lower part of which is also formed a longitudinal slot 25 running the full length of the casing and opening into a groove 26 of substantially rectangular form located directly thereunder. In the groove 26 is positioned a sliding ratchet bar 27, the teeth 28 on each side edge of which are inclined toward the front end of the casing 20. Attached to the ratchet bar 27 by a screw bolt or similar manner, is a stud 29, to which is secured by a pivoted link 30 a cylindrical spring scale 1 arranged to move longitudinally in the groove 24 with ratchet bar 27, through the medium of the mechanism hereinafter described.

The lower surface and sides of the groove 26, in which ratchet bar 27 is housed, is broken away for a short distance (Fig. 7), preferably at a point about intermediate the ends of the casing 20, so as to expose such bar and its teeth 28 to permit engagement therewith of teeth 31 on the ends of lever arms 32 pivotally secured to a rocking plate 33 mounted on a bridge piece 34 extending over such broken away portion of the groove housing, the teeth 31 being normally held in engagement with the teeth 28 by a coil spring 37 or similar equivalent means attached to the ends of the lever arms 32 and tending to pull the same together. To the rocking plate 33 is removably attached a handle 35 extending outside of the side wall of the casing 20 at a cutaway portion 36 thereof, which handle, when moved back and forth, will, due to the inclination of the teeth 28 on bar 27, alternately cause the teeth 31 on lever arms 32 to ride over and engage the teeth 28 on opposite sides of bar 27 and impart a step-by-step movement thereto in a rearward direction, for a purpose hereinafter described. To permit disengagement of the teeth 31 from teeth 28, for adjustment of the device before and after use, the lever arms 32 may be simultaneously thrown out of operative position by a lever 38 pivoted at 39 to the bridge piece 34, such lever 38 having pins 40, 41 thereon arranged to contact with the lever arms 32 at points intermediate their ends when the lever 38 is shifted to the position shown in Fig. 7, or approximately at right angles to the length of the bridge piece. When the lever 38 is in this position, it abuts against the edge of the cutaway portion 36' of the casing 20, and the pin 41 on such lever is then slightly in advance of the pivotal point of the lever so that the latter will remain in adjusted position due to the tension of spring 37, until such lever is manually moved forward and pins 40, 41 are thrown out of engagement with the arms 32, when the tension of spring 37 will draw the arms 32 together until the teeth 31 thereon engage the teeth 28 on the bar 27.

Attached to the casing of the spring scale 1 by a collar 42, or in any other preferred manner, is an indicator 43 arranged to move over a graduated surface 44 which may advantageously be made separate from the casing 20 and positioned and adjustable longitudinally in a groove 45 formed in the top of the casing, such scale being securely fastened in adjusted position by the heads of thumb screws 46 tapped into the casing 20. Forward movement of the ratchet bar and scale is limited by a stop 45' secured to the casing.

The rope-engaging means (Figs. 8, 9, 10 and 11) which may be conveniently secured to the spring scale 1 by an ordinary pin and link connection indicated generally at 47, comprises a rod 48, preferably of metal and composed of a plurality of sections secured together by screw sockets 49 of ordinary construction. The outer section of the rod is provided with a novel form of rope-engaging hook 2, whereby the latter may be automatically sprung into and out of positive engagement with the rope to be tested and the latter securely held without any side play in the hook. This part of the device comprises a cylindrical sleeve 3 encircling the stem 4 of the hook 2. The sleeve 3 has slidably mounted thereon a cylindrical casing 5, within which is positioned a coil spring 9, secured at one end to a collar 7 which may be, as shown, formed as a part of the end of the casing 5 and such collar being arranged to slide on the sleeve 3. At its other end the spring 6 is secured to a collar 8 through which the shank 4 of the hook 2 is arranged to slide freely, the opening in such collar being sufficiently small to cause it to abut against the end of the sleeve 3, so that the spring will be held under constant tension and normally hold the casing 5 against the bend of the hook. Thus, when the rod 48 is pushed forward the shank 4 of hook 2 will move longitudinally within the casing 5 as the latter abuts against the rope and remains stationary, and the hook thus opened for disengagement from the rope. Pivotally secured to the hook 2, at a suitable point thereon, is a trigger bar 9 of slightly different contour from the hook, the end of such trigger bar being suitably notched as shown at 10 so as to engage the edge of a cutaway portion 11 of the casing 5, and when so positioned will hold the casing back against the pull of the spring 6 so that the hook 2 will be open and ready for engagement with the rope to be tested. When it is desired to positively secure the hook to the rope to be tested, the hook is opened by pushing the casing 5 back and engaging the notch 10 of the trigger bar with the cutaway portion 11 of the casing 5, and the hook 2 placed about the rope, as shown in Fig. 10. The hook is then pressed against the rope which, striking the trigger bar 9, displaces the same and the casing 5 springs forward and firmly holds the rope in the hook. To release the rope from the hook, it is only necessary to push forward on the rod 48, as above explained, when the rod may be partially rotated and the hook freed from the rope. In this latter operation it is of course necessary to first disconnect the link 47, and it is also preferable to turn the rod in a clockwise direction to prevent loosening the screw sockets.

Secured to the casing 20 at the rear end thereof, there is preferably provided a footpiece 50 on which the operator stands when making the tests hereinafter described, so that the device may be held in position as the tests on the different ropes are made. This foot piece may advantageously be removably secured to the casing by thumb screws 51, or in any other suitable manner, so as to be conveniently packed for transportation of the device.

The operation of the device will be briefly described as follows: Assuming that the ropes of a newly installed elevator in, say, a twelve story building, are to be tested to determine whether such ropes are carrying equal loads, the car is first positioned at the first landing and the device above described is then positioned on the seventh floor of the building, substantially in the position shown in Fig. 1, but preferably at an angle to the shaft or at a point approximately in front of the plane of the plurality of sheave ropes to facilitate engagement of the hook 2 therewith. The lever 38 is now thrown into the position shown in Fig. 7 to permit the ratchet bar 27 to move freely back and forth in its groove. The rope engaging rod having been assembled, the hook 2 thereof is placed in engagement with the rope and positively attached thereto as above described. The rod 48 is now connected by the pin and link 47 to the beam of the spring scale 1. The device is now positioned on the floor so that, with the elevator rope to which it is attached in a neutral position, or undeflected, the indicator 43 will be at zero on the graduated surface 44 and with the spring scale 1 well advanced beyond the end of the casing 20, as shown in Fig. 2. The lever 38 is now thrown forward to place the ratchet bar 27 in operative engagement with its operating mechanism, as previously described, and the handle 35 is then moved back and forth until the spring scale shows a pull of 25 pounds, as indicated in Fig. 5, at which point, dependent on the tension on the rope being tested, the indicator 43 will show a deflection in inches commensurate with the pressure of 25 pounds required to produce such deflection. A record is made of the readings of the different ropes as they are tested, and proper adjustments may then be readily made to properly distribute the load equally on each of the sheave ropes if it is found that one or more ropes are carrying more than its or their share of the load.

While but one embodiment and method of operation of the invention has been illustrated and described, it will be understood that various changes in the construction shown may be made without departing from the invention defined by the claims. It will also be understood that various methods of use may be resorted to, in addition to the specific example given, and that tests should be made on different floors and with the car on its ascending and descending trips, to determine the presence of slight or severe differential sheave actions which, in the first case, will cause undue wear and deterioration of the ropes, and in the latter case may be such as to cause slippage of one or more ropes with a consequent very rapid wear of the sheaves and ropes thus subjected to slippage. Such methods of use, however, will be apparent to those skilled in this art, and further description thereof is not believed to be necessary. It will be understood, also, that a rope testing device embodying the invention may be used for testing other than elevator ropes, and that the invention is useful generally in rope testing.

What is claimed is:

1. A rope tension testing device, comprising means for subjecting a rope to lateral deflection, means for measuring the lateral pressure exerted, and means for indicating the degree of lateral deflection produced by such lateral pressure.

2. A rope tension testing device, comprising means for subjecting a rope to a predetermined lateral pressure, and means cooperating with said pressure exerting means for indicating the degree of lateral deflection of said rope produced by such pressure.

3. A rope tension testing device, comprising means for laterally deflecting a rope under tension, a scale and indicator for measuring the degree of such lateral deflection, and means for indicating the pressure required to produce an indicated lateral deflection.

4. A rope tension testing device, comprising means for exerting lateral pressure on a rope under tension, a pressure scale cooperating with said pressure exerting means for indicating the lateral pressure exerted, and a scale and indicator for indicating the degree of lateral deflection of said rope at an indicated lateral pressure.

5. A rope tension testing device, comprising a ratchet bar and operating mechanism therefor for exerting lateral pressure on a rope under tension, a pressure scale mounted on said ratchet bar to which said scale is attached for indicating the lateral pressure exerted, an indicator mounted on and arranged to move with said pressure producing means, and a member having a graduated surface cooperating with said indicator for indicating the degree of lateral deflection of a rope at an indicated lateral pressure.

6. A rope tension testing device, comprising a casing, a ratchet bar mounted therein, lever mechanism for moving said ratchet bar longitudinally of said casing, a spring scale mounted on said ratchet bar, means for attaching said scale to the rope to be tested, a wall on said casing having a graduated surface, and an indicator carried on the longitudinally movable members in said casing and arranged to cooperate with said graduated surface for indicating the degree of lateral deflection of said rope produced by an indicated pressure on said scale.

7. The combination with a rope tension testing device having means for producing lateral deflection of a rope, and means for measuring the lateral pressure exerted and for indicating the degree of such lateral deflection, of a rope grapple having means for automatically springing the same into and out of positive engagement with the rope to be tested.

In testimony whereof, I have hereunto set my hand.

CHARLES C. SUNDERLAND.